US009967908B2

(12) United States Patent
Du et al.

(10) Patent No.: US 9,967,908 B2
(45) Date of Patent: May 8, 2018

(54) METHOD AND DEVICE FOR REUSING CHANNEL FREQUENCIES IN DIRECT MODE

(71) Applicant: MOTOROLA SOLUTIONS, INC, Schaumburg, IL (US)

(72) Inventors: Quan-Wen Du, Sichuan (CN); Yueh Ching Chung, Pinang (MY); Yu-Yang Zheng, Sichuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days. days.

(21) Appl. No.: 14/890,313

(22) PCT Filed: May 10, 2013

(86) PCT No.: PCT/CN2013/075495
§ 371 (c)(1),
(2) Date: Nov. 10, 2015

(87) PCT Pub. No.: WO2014/179993
PCT Pub. Date: Nov. 13, 2014

(65) Prior Publication Data
US 2016/0150579 A1    May 26, 2016

(51) Int. Cl.
*H04W 76/02* (2009.01)
*H04W 74/00* (2009.01)
(Continued)

(52) U.S. Cl.
CPC ............ *H04W 76/023* (2013.01); *H04W 4/06* (2013.01); *H04W 74/00* (2013.01); *H04W 74/0808* (2013.01); *H04W 84/08* (2013.01)

(58) Field of Classification Search
CPC ..... H04W 76/023; H04W 4/06; H04W 74/00; H04W 74/0808; H04W 84/08
See application file for complete search history.

(56) References Cited

U.S. PATENT DOCUMENTS 4,955,083 A * 9/1990 Phillips .................... H04B 1/68
                                                  375/270
5,666,661 A * 9/1997 Grube ................... H04W 84/08
                                                  455/509
(Continued)

FOREIGN PATENT DOCUMENTS

CN      101873545      10/2010
CN      102598706      7/2012
GB      2409375        6/2005

OTHER PUBLICATIONS

ETSI Technical Report 300-3 "Terrestrial Trunked Radio (TETRA); Voice plus Data (V+D); Designer's guide Part 3: Direct Mode Operation (DMO)" published Feb. 2000; http://www.etsi.org/deliver/etsi_etr/300_399/30003/01_60/etr_30003e01p.pdf; accessed Mar. 27, 2017; pp. 33-40.*

(Continued)

Primary Examiner — Luat Phung
Assistant Examiner — Thomas R Cairns

(57) ABSTRACT

In a direct mode two-way radio frequency communications system having a plurality of direct mode traffic channels, a first direct mode subscriber unit (DMSU) monitors a preconfigured direct mode control channel (DMCC), the DMCC being a channel that is monitored by all DMSUs that are idle in the system, and which is time divided into slots including traffic channel status slots (TCSSs), each TCSS associated with another physical direct mode traffic channel (DMTC) in the communication system. Responsive to detecting a request to initiate a new call, the DMSU selects a first DMTC on which to transmit the call, transmits during the next TCSS of the DMCC associated with the selected DMTC a header indicating the first DMSU's intention to transmit a new call on the selected DMTC, and subsequently switches to the selected DMTC and transmits the new call.

21 Claims, 9 Drawing Sheets

(51) Int. Cl.
  *H04W 74/08*  (2009.01)
  *H04W 4/06*   (2009.01)
  *H04W 84/08*  (2009.01)

(56) References Cited

U.S. PATENT DOCUMENTS

| | | | | |
|---|---|---|---|---|
| 5,946,306 | A * | 8/1999 | Talarmo | H04W 72/042 370/337 |
| 6,404,756 | B1 | 6/2002 | Whitehill et al. | |
| 6,952,426 | B2 * | 10/2005 | Wu | H04W 52/0206 370/311 |
| 6,980,540 | B1 | 12/2005 | Laroia et al. | |
| 6,983,162 | B2 * | 1/2006 | Garani | H04B 7/2606 455/11.1 |
| 7,606,256 | B2 | 10/2009 | Vitebsky et al. | |
| 8,180,281 | B2 * | 5/2012 | Goodjohn | H04W 72/0453 455/11.1 |
| 8,570,972 | B2 * | 10/2013 | Laroia | H04W 76/021 370/231 |
| 8,738,057 | B2 * | 5/2014 | Fukuzawa | H04W 72/0406 455/41.1 |
| 8,867,521 | B2 * | 10/2014 | Hakola | H04B 1/713 370/310 |
| 9,144,098 | B2 * | 9/2015 | Hakola | H04W 76/023 |
| 9,179,485 | B2 * | 11/2015 | Stephens | H04W 12/06 |
| 9,380,625 | B2 * | 6/2016 | Schmidt | H04W 76/023 |
| 9,392,630 | B2 * | 7/2016 | Yi | H04W 74/04 |
| 9,538,566 | B2 * | 1/2017 | Choi | H04L 1/16 |
| 2010/0085952 | A1 | 4/2010 | Wiatrowski et al. | |
| 2012/0272089 | A1 * | 10/2012 | Hatfield | G06F 13/4291 713/501 |
| 2013/0201956 | A1 * | 8/2013 | Cho | H04W 72/048 370/329 |
| 2014/0092788 | A1 * | 4/2014 | Ji | H04W 72/0446 370/280 |
| 2014/0233549 | A1 * | 8/2014 | Kim | H04W 72/082 370/338 |
| 2015/0078279 | A1 * | 3/2015 | Ko | H04L 1/1861 370/329 |
| 2015/0087236 | A1 * | 3/2015 | Eun | H04M 1/7253 455/41.2 |
| 2015/0195817 | A1 * | 7/2015 | Sathananthan | H04W 72/042 370/329 |
| 2015/0341972 | A1 * | 11/2015 | Gruet | H04W 76/002 370/329 |
| 2016/0113050 | A1 * | 4/2016 | Li | H04W 52/0209 370/329 |

OTHER PUBLICATIONS

Chen et al., "A Media-Access Protocol for Packet-Switched Wavelength Division Multiaccess Metropolitan Area Networks," brochure (1990) pp. 1048-1057, IEEE Journal on Selected Areas in Communications, vol. 8 No. 6.

Lin et al., "Dynamic Control Frames in Reservation-Based Packet Scheduling for Single-Hop WDM Networks," specification (2003) 9 pages.

PCT/CN2013/075495 International Search Report and Written Opinion dated Feb. 20, 2014 (9 pages).

* cited by examiner

US 9,967,908 B2

METHOD AND DEVICE FOR REUSING CHANNEL FREQUENCIES IN DIRECT MODE

This application is a National Stage filing under 35 USC § 371 of co-pending Patent Cooperation Treaty international application having Serial No. PCT/CN2013/075495 (the 'PCT international application') filed on May 10, 2013. This application claims priority to the PCT international application, the entire contents of which are incorporated herein by reference.

BACKGROUND OF THE INVENTION

Many varieties of two-way radio communications systems are known in the art. FIG. 1 is a block diagram illustrating both a typical conventional radio system 101 and a trunked radio system 103. In the conventional radio system 101, a plurality of subscriber units are formed into talkgroups. Each talkgroup is permanently assigned to a separate channel for communication. Thus, each talkgroup is served by one channel. In contrast, the trunked radio system 103 and its subscriber units use a pool of channels for virtually an unlimited number of talkgroups. Thus, all talkgroups are served by all channels. The trunked radio system 103 works to take advantage of the probability that not all talkgroups need a channel for communication at the same time. Estimates are made about how much load a typical user presents to the system in terms of calls per hour and duration of each call. For a traffic load, fewer channels are required since all talkgroups are served by all channels. Combining this with the number of users on the system, and the acceptable quality of service (QoS), determines how many trunked channels are required to satisfactorily serve the number of users. With a given number of channels, a much greater number of talkgroups can be accommodated as compared with conventional radio systems. Hence, a primary purpose of a trunked radio system is the efficient utilization of channels allowing for more users to carry many conversations over a fewer number of distinct channels.

As seen in FIG. 2, a conventional trunked radio system 201 uses a dedicated or exclusive channel, which is often referred to as a control channel 205, for handling call requests and for assigning particular traffic channels (CH's 1-3) to particular groups of subscriber units for a call. An infrastructure controller 207 controls what is broadcast on the control channel 205 via a control channel repeater. Other terms that sometimes refer to the infrastructure controller 207 include trunking controller, site controller, resource allocator, channel allocator, controller, and other like terms. The infrastructure controller 207 continuously, periodically, or intermittently causes the control channel repeater to broadcast a control signal on the control channel 205, so that subscriber units can locate the control channel 205, transmit new call requests on the control channel 205, and monitor the control channel 205 for new call requests that they may be interested in joining.

In order to start a group call (i.e., a one-to-many call), a subscriber unit requests, via a transmission on the control channel 205 to the infrastructure controller 207, that a traffic channel is allocated for its use, and the infrastructure controller 207 transmits instructions back, on the control channel 205, telling subscriber units in the group that are interested in the call to switch to the traffic channel assigned for that call. A similar process may be followed when a subscriber unit starts an individual call (i.e., a one-to-one call). In the example set forth in FIG. 2, subscriber units 1 and 2, after one of them had transmitted a request on the control channel 205, have been assigned traffic channel CH 1 to transmit call traffic on, and subscriber units 3, 4, 5, and 6, after one of them had transmitted a request on the control channel 205, have been assigned traffic channel CH 3 to transmit call traffic on.

In other types of trunked systems, the control channel 205 may be switched to a traffic channel for a newly requested call, and all subscriber units not interested in the new call instructed to move to a new channel that will become the new control channel for the remaining subscriber units.

One disadvantage of the trunked radio system 201 is that an infrastructure controller 207 and a control channel repeater is required to maintain control over channel assignments and the control channel repeater is required to continually, periodically, or intermittently broadcast a control signal on the control channel 205 so that subscriber units can find the control channel 205 and so that centralized control over traffic channel assignments may be provided.

BRIEF DESCRIPTION OF THE SEVERAL VIEW OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 7:
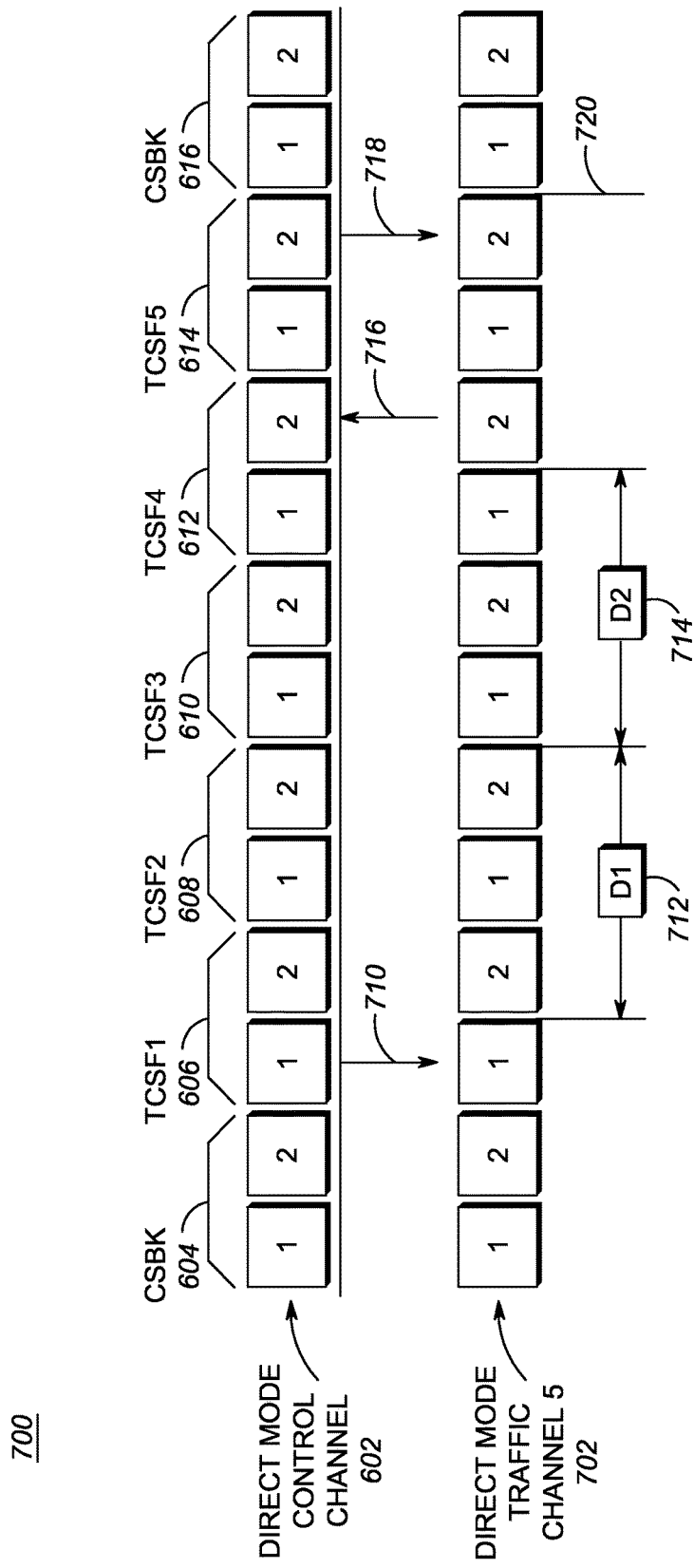
FIG. 7 is a timing diagram of a direct mode call startup using the TDMA direct mode control channel of FIG. 6 and an associated TDMA direct mode traffic channel in accordance with an embodiment.
Figure 8A:
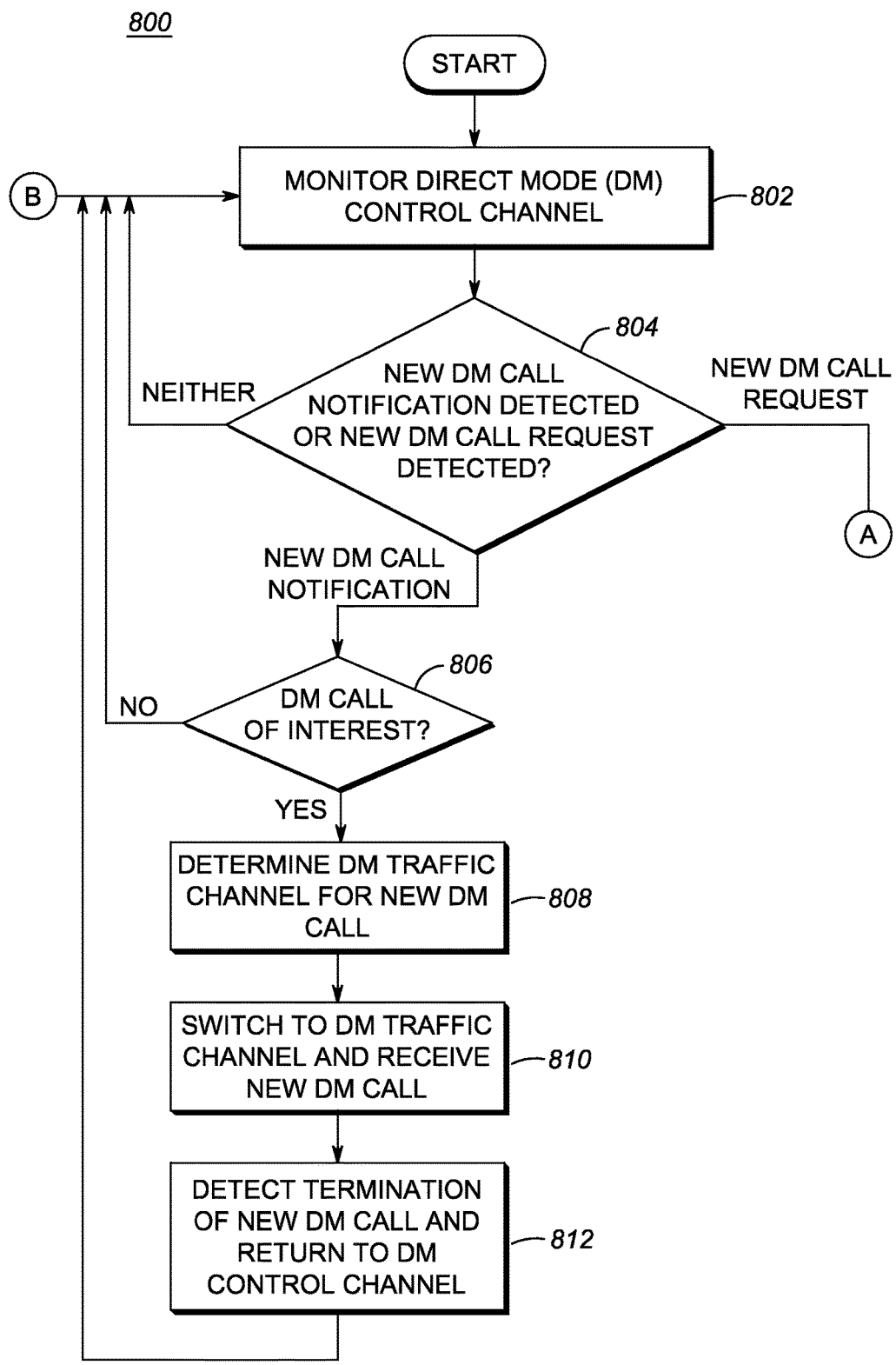
Figure 8B:
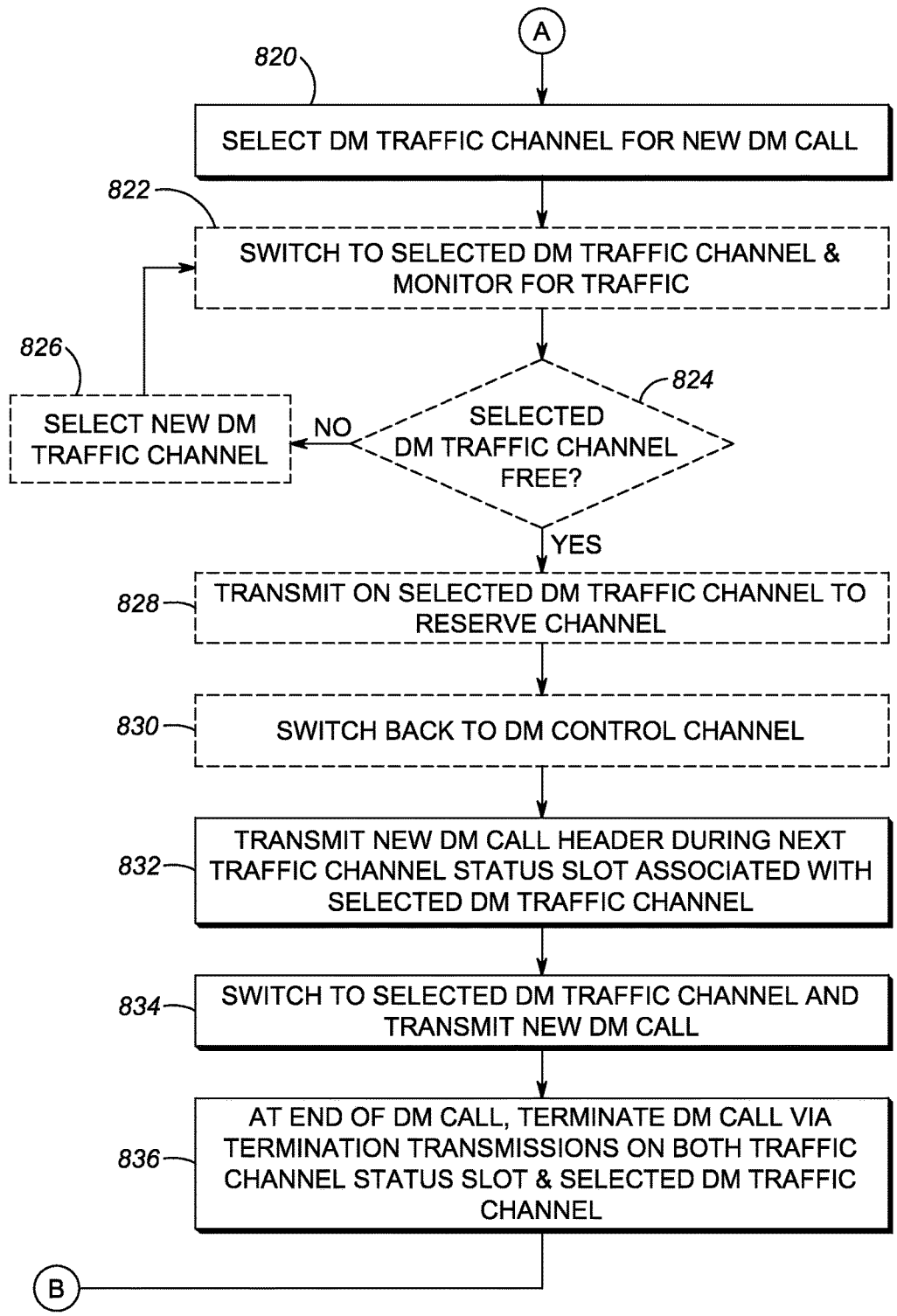

FIGS. 8A and 8B set forth a flowchart illustrating a process used by a direct mode subscriber unit for participating in and initiating new direct mode calls using the TDMA direct mode control channel and associated TDMA direct mode traffic channel of FIG. 7 in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In light of the foregoing, it would be advantageous to provide for a method and device that can apply the more efficient channel allocation and channel re-use features of infrastructure-based trunked system to a direct mode system in which no centralized infrastructure is available to maintain a centralized control channel and to arbitrate, assign, and allocate traffic channels for requested calls.

In one embodiment a method comprises monitoring, by a first direct mode subscriber unit, a preconfigured direct mode control channel, the direct mode control channel being a channel that is monitored by all direct mode subscriber units that are idle in the system, and which is time divided into a plurality of slots including a plurality of traffic channel status slots, each traffic channel status slot associated with another physical direct mode traffic channel in the communication system. Responsive to detecting a request to initiate a new direct mode call, the first direct mode subscriber unit selecting a first particular direct mode traffic channel on which to transmit the new direct mode call. The first direct mode subscriber unit then transmits, during the next traffic channel status slot of the direct mode control channel that is associated with the selected direct mode traffic channel, a header indicating the first direct mode subscriber unit's intention to transmit a new direct mode call on the selected direct mode traffic channel. Subsequently, the first direct mode subscriber unit then switches to the selected direct mode traffic channel and transmits the new direct mode call on the selected direct mode traffic channel.

In another embodiment a direct mode two-way RF subscriber unit includes a transceiver and a processor. The processor is configured to monitor, via the transceiver, a preconfigured direct mode control channel, the direct mode control channel being a channel that is monitored by all direct mode subscriber units that are idle in the system, and which is time divided into a plurality of slots including a plurality of traffic channel status slots, each traffic channel status slot associated with another physical direct mode traffic channel in the communication system. The processor is further configured to, responsive to detecting a request to initiate a new direct mode call: select a first particular direct mode traffic channel on which to transmit the new direct mode call, and transmit, via the transceiver and during the next traffic channel status slot of the direct mode control channel that is associated with the selected direct mode traffic channel, a header indicating the first direct mode subscriber unit's intention to transmit a new direct mode call on the selected direct mode traffic channel. The processor is further configured to subsequently switch to the selected direct mode traffic channel and transmit, via the transceiver, the new direct mode call on the selected direct mode traffic channel.

Each of the above-mentioned embodiments will be discussed in more detail below, starting with example network and device architectures of the system in which the embodiments may be practiced, followed by a discussion of direct mode control channel timing and direct mode call setup from a system perspective, and then by a discussion of direct mode call participation and call initiation from a direct mode subscriber unit perspective. Further advantages and features consistent with this disclosure will be set forth in the following detailed description, with reference to the figures.

I. Network and Device Architectures

Figure 1:
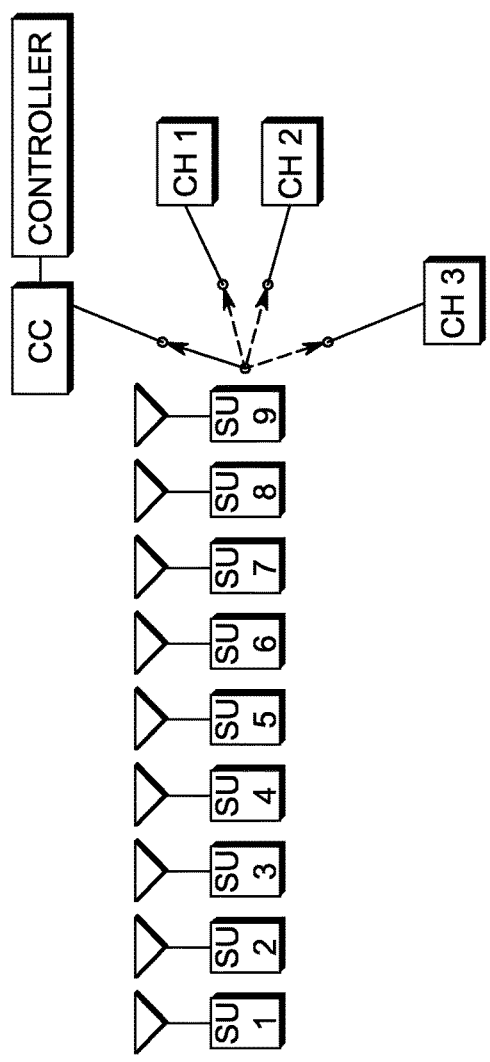
FIG. 1 is a prior art block diagram illustrating both a conventional radio system and a trunked radio system.
Figure 1:
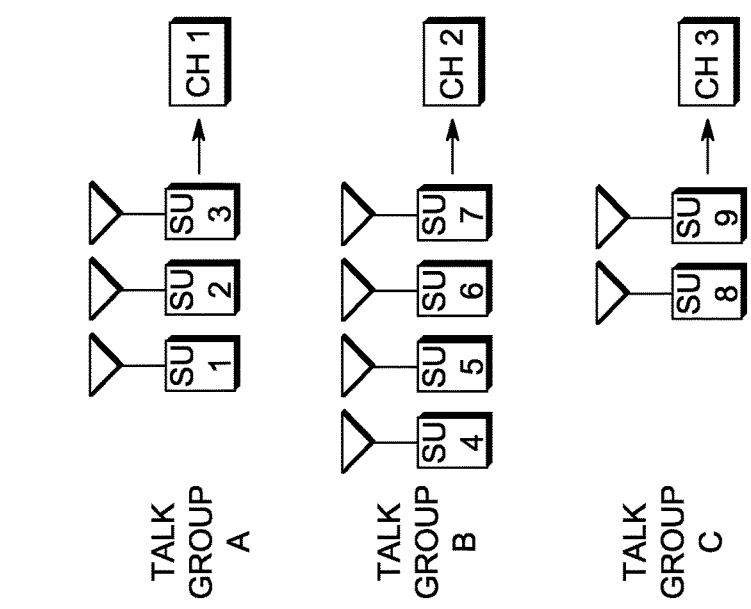
Figure 2:
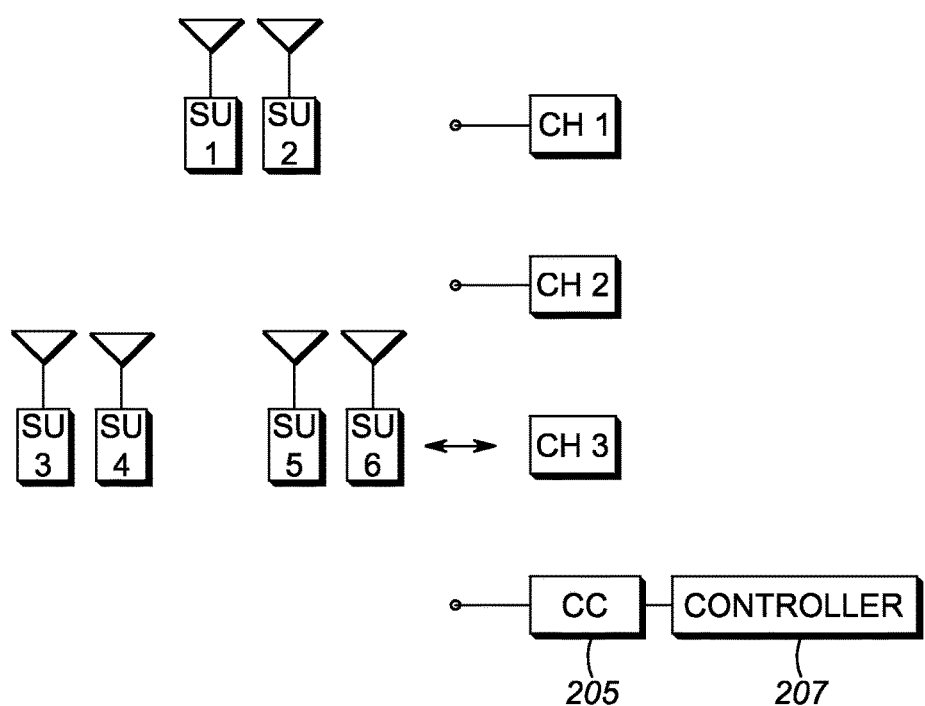
FIG. 2 is a prior art block diagram illustrating a trunked radio system in which traffic channels have been assigned.
Figure 3:
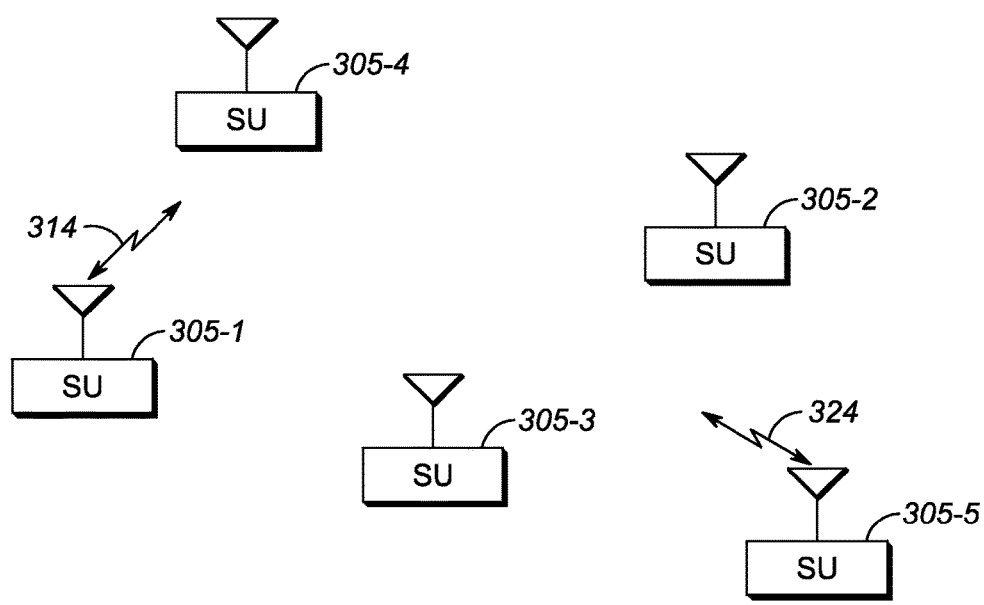
FIG. 3 is a block diagram of an illustrative digital conventional direct mode wireless communications system operating in accordance with an embodiment.

Referring now to FIG. 3, an example of a digital conventional direct mode wireless communications system 300 comprising a plurality of subscriber units (SUs) 305 operating in accordance with an embodiment is illustrated. SUs 305-1 through 305-5 communicate with each other on direct mode radio frequencies, such as frequencies 314 and 324, without communicating through any infrastructure including, for example, a repeater or base station. It will be appreciated by those of ordinary skill in the art that in some embodiments the frequency could also have repeaters on it, but radios 305 may not use those repeaters (e.g., the repeaters could belong to a different system, or the radios are operating in a talk-around mode).

A SU, as used herein, can be mobile and/or fixed end equipment that is used to obtain direct mode wireless communications services. For example, a SU can be a mobile radio (i.e. a portable radio, a mobile station, a subscriber unit, a mobile subscriber), or can be a fixed station (i.e. a fixed control station, a base station, and any supporting equipment such as wireline consoles and packet data switches). Each SU is capable of communicating directly with one or more other SUs using techniques as further described herein, such as TDMA, in which specified time segments are divided into assigned time slots for individual communications and each radio frequency (RF) in the system carries time slots whereby each time slot is known as a "channel." In the case of TDMA, traffic channels may be separated by time alone or by a combination of time and frequency. In the case of FDMA communications, traffic channels may be separated solely by frequency, and in CDMA communications, traffic channels may be separated by spreading code alone or by a combination of code and frequency.

For ease of describing the embodiments hereinafter, the digital conventional direct mode wireless communications system 300 is presumed to be a two time slot TDMA communications system in accordance with the ETSI-DMR standard. Thus, in the embodiments described below, since there are two time slots, there are two channels available on each radio frequency for carrying the traffic of the system. A time slot is an elementary timing of the physical channel. For example, in one embodiment consistent with the ETSI-DMR standard for repeater-based communications, a time slot has a length of thirty milliseconds (30 ms) and is numbered "1" or "2". Of course, in other embodiments, different slotting ratios and different slot lengths could be used.

Figure 4:
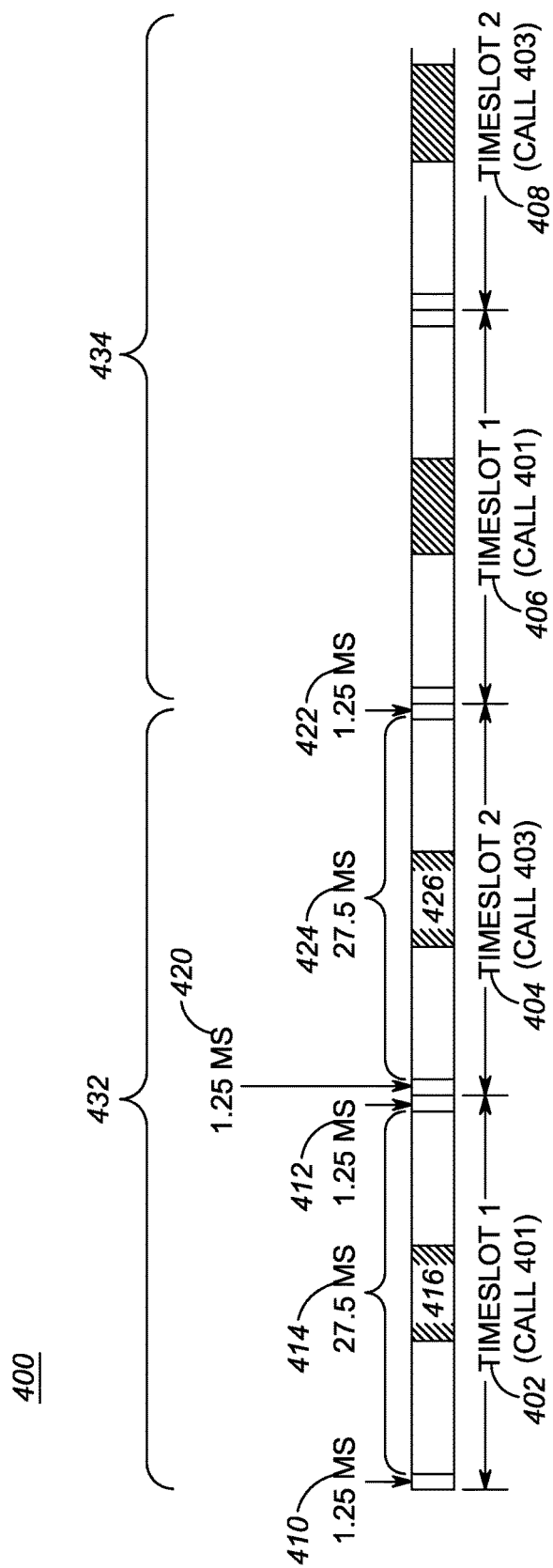
FIG. 4 is a transmission diagram illustrating an example time division multiple access (TDMA) direct mode traffic channel that may be used in the digital conventional direct mode wireless communications system of FIG. 3.

FIG. 4 illustrates an example two time slot TDMA communications timing diagram 400 consistent with the ETSI-DMR standard. Timeslot 1 402 includes 1.25 ms guard intervals 410, 412 and a 27.5 ms payload period 414 that includes a sync slot 416. Timeslot 2 404 similarly includes 1.25 ms guard intervals 420, 422 and a 27.5 ms payload period 424 that includes a sync slot 426. Timeslots 1 and 2 then repeat in an interleaved manner as illustrated in FIG. 4, including a second timeslot 1 406 for use by a same direct mode call 401 as used in timeslot 1 402, and another timeslot 2 408 for use by a same direct mode call 403 as used in timeslot 2 404, repeating in an interleaved manner until one or both calls end. Timeslots 1 402 and 2 404 together form a first frame 432, and timeslots 1 406 and 2 408 together form a second frame 434.

Figure 5:
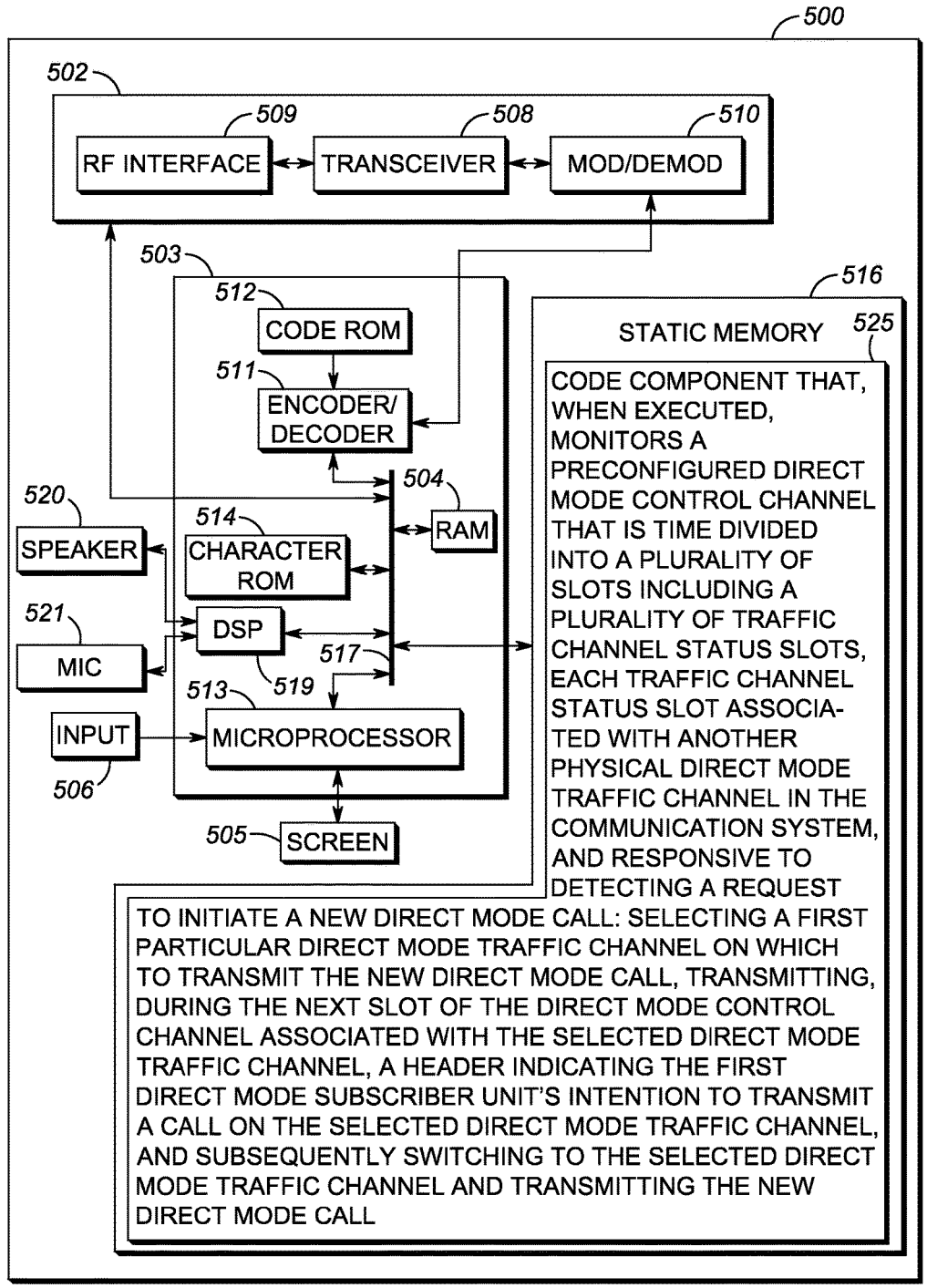
FIG. 5 is a block diagram of a direct mode wireless subscriber unit (SU) operable in the digital conventional direct mode wireless communications system of FIG. 3 in accordance with an embodiment.

FIG. 5 is an example functional block diagram of a direct mode SU, such as SU 305-1 operating within the system 300 of FIG. 3, in accordance with some embodiments. Other direct mode SU s such as SUs 305-2 to 305-5 may contain same or similar structures. As shown in FIG. 3, SU 500 includes a communications unit 502 coupled to a common data and address bus 517 of a processing unit 503. The SU 500 may also include an input unit (e.g., keypad, pointing device, etc.) 506 and a display screen 505, each coupled to be in communication with the processing unit 503.

The processing unit 503 may include an encoder/decoder 511 with an associated code Read Only Memory (ROM) 512 for storing data for encoding and decoding voice, data, control, or other signals that may be transmitted or received between other radios within direct mode communication range of SU 500. The processing unit 503 may further include a microprocessor 513 coupled, by the common data and address bus 517, to the encoder/decoder 511, a character ROM 514, a Random Access Memory (RAM) 504, and a static memory 516.

The communications unit 502 may include an RF interface 509 configurable to communicate directly with other direct mode SUs such as SUs 305-2 to 305-5. The communications unit 502 may include one or more wireless transceivers 308, such as a DMR transceiver, an APCO P25 transceiver, a TETRA transceiver, a Bluetooth transceiver, a Wi-Fi transceiver perhaps operating in accordance with an IEEE 802.11 standard (e.g., 802.11a, 802.11b, 802.11g, 802.11n), a WiMAX transceiver perhaps operating in accordance with an IEEE 802.16 standard, and/or other similar type of wireless transceiver configurable to communicate via a wireless network. The transceiver 508 is also coupled to a combined modulator/demodulator 510 that is coupled to the encoder/decoder 511.

The microprocessor 513 has ports for coupling to the input unit 506 and to the display screen 505. The character ROM 514 stores code for decoding and/or encoding data such as control messages and/or data or voice messages that may be transmitted or received by the SU 500. Static memory 516 may store operating code for the microprocessor 513 that, when executed, monitors a preconfigured direct mode control channel that is time divided into a plurality of slots including a plurality of traffic channel status slots, each traffic channel status slot associated with another physical direct mode traffic channel in the communication system, and responsive to detecting a request to initiate a new direct mode call: selecting a first particular direct mode traffic channel on which to transmit the new direct mode call, transmitting, during the next slot of the direct mode control channel associated with the selected direct mode traffic channel, a header indicating the first direct mode subscriber unit's intention to transmit a call on the selected direct mode traffic channel, and subsequently switching to the selected direct mode traffic channel and transmitting the new direct mode call, in accordance with one or more of FIGS. 6-8 and corresponding text. Static memory 516 may comprise, for example, a hard-disk drive (HDD), an optical disk drives such as a compact disk (CD) drive or digital versatile disk (DVD) drive, a solid state drive (SSD), a flash memory drive, or a tape drive, to name a few.

II. Direct Mode Subscriber Unit Call Initiation and Participation Processes

Figure 6:
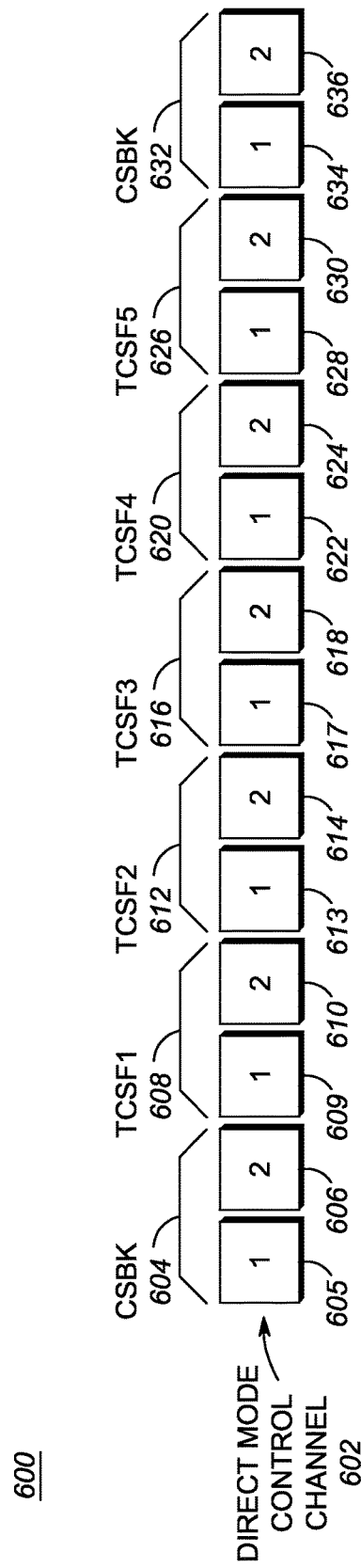
FIG. 6 is a timing diagram of a TDMA direct mode control channel in accordance with an embodiment.

FIGS. 6-7 set forth example direct mode control channel and traffic channel timing diagrams and call setup processes from a system perspective, and FIGS. 8A and 8B set forth processes that may be used by a direct mode SU for participating in and initiating new direct mode calls using the example direct mode control and traffic channel timings of FIGS. 6-7. Of course, additional steps not disclosed herein could be additionally added before, after, or in-between steps disclosed in FIGS. 8A and 8B, and other control channel and traffic channel slotting ratios and other types of traffic channels could be implemented in other embodiments. Steps drawn with a dashed outline in FIG. 8B should be understood to be optional steps. And while FIGS. 6-8 are described consistent with ETSI-DMR slot timings and structure, other protocols and other slot timings and structures could additionally or alternatively be used.

FIG. 6 illustrates an example timing diagram 600 of a direct mode control channel 602 consistent with an embodiment of this disclosure. As illustrated, the direct mode control channel 602 may be a TDMA channel with a 2:1 slotting ratio. In this example, it is assumed that, in addition to the direct mode control channel 602, there are five other distinct direct mode TDMA traffic channels available (traffic channels 1-5) in the communication system over which voice and/or data communications (point to point or group) may be conducted, each direct mode TDMA traffic channel also having a 2:1 slotting ratio (e.g., slots 1 and 2) and thus supporting two calls per traffic channel. Accordingly, control channel 602 correspondingly includes five traffic channel status frames TCSF1 608, TCSF2 612, TCSF3 616, TCSF4 620, TCSF5 626, each of which includes a first traffic channel status slot and a second traffic channel status slot. Each traffic channel status frame is associated with the corresponding physical traffic channel available in the communication system for voice and/or data communications.

Accordingly, TCSF1 608 includes a first traffic channel status slot 609 in which announcements regarding current use or an intent to use the first slot of the physical first traffic channel (TC 1) in the communication system are broadcast and a second traffic channel status slot 610 in which announcements regarding current use or an intent to use the second slot of the physical first traffic channel TC 1 in the communication system are broadcast. Similarly, TCSF2 612, TCSF3 616, TCSF4 620, and TCSF5 626 include first and second traffic channel status slots (613 and 614, 617 and 618, 622 and 624, 628 and 630, respectively) in which announcements regarding current use or an intent to use the physical traffic channel slots of those traffic channels (TCs 2-5) may be broadcast.

Of course, other types of direct mode traffic channels could be used as well, which could necessitate variations in the direct mode control channel structure and timing. For example, in systems including more or fewer than five direct mode TDMA traffic channels, more or fewer TCSF frames may be required on the direct mode control channel. Furthermore, in system using direct mode TDMA traffic channels having different slotting ratios than 2:1, each TCSF frame on the control channel may include more than or less than two traffic channel status slots. Additionally, in systems using other types of divided traffic channels, such as FDMA traffic channels, each TCSF frame on the direct mode control channel may include only one slot. In the case of CDMA traffic channels, the direct mode control channel may include a single TCSF frame per available CDMA frequency and a slot in each TCSF frame dependent upon the number of codes supported on each CDMA frequency. Other examples are possible as well.

The direct mode control channel 602 may additionally and optionally include one or more control signaling frames, such as control signaling block (CSBK) frame 604 including CSBK slots 605 and 606. In some embodiments, CSBKs are always transmitted in the first slot of the CSBK frame (slot 1 605 in FIG. 6), and any further slots in the CSBK frame (slot 2 606 in FIG. 6), to aid direct mode SUs in time-aligning to transmitted CSBKs (e.g., without having to include the slot # of the slot it is transmitted in the CSBK itself). CSBK slots 605 and/or 606 may be used to transmit signaling between direct mode SUs to support, for example, Off Air Call Set Up (OACSU) private calls, call alerts, radio checks, radio enable/disable, and remote monitor, among other possibilities. A direct mode control channel superframe comprised one or more traffic channel status frames and optionally one or more CSBK frames repeats in a time division manner. For example, a first superframe including CSBK frame 604 and traffic channel status frames TCSF1 608-TCSF5 626 is illustrated in FIG. 6, along with the first CSBK frame 632 (including first and second CSBK slots 634, 636) of a beginning of a second superframe (not fully illustrated in FIG. 6).

FIG. 7 sets forth one example timing diagram 700 of how the direct mode control channel 602 of FIG. 6 may be used to select and announce a new direct mode call that will be conducted on a particular slot of a particular direct mode traffic channel (slot 1 of direct mode traffic channel 5 702 in this example). As illustrated in FIG. 7, in some embodiments, direct mode TDMA traffic channels may be time-aligned to the direct mode control channel (e.g., slot 1 of each frame of the traffic channel is time-aligned to a slot 1 of each frame of the control channel). Of course, in other embodiments, the direct mode traffic channels need not be time-aligned to the direct mode control channel.

It is assumed in this example that a user of a direct mode SU that is idling on and monitoring the direct mode control channel 602 pushes the push-to-talk (PTT) button on his or her radio during slot 1 of TCSF1 606. In response to detecting a request to start a new direct mode call, the SU chooses a first direct mode traffic channel on which to conduct the new direct mode call, and switches to the chosen first direct mode traffic channel as illustrated via arrow 710 in FIG. 7. In this example, it is assumed that the SU chooses direct mode traffic channel 5 702, for any number of reasons as discussed in more detail with respect to FIGS. 8A and 8B. After switching to the selected direct mode traffic channel 5 702, the SU monitors the direct mode traffic channel 5 702 for a first period of time D1 712 for any traffic indicative of another direct mode SU's use, or intent to use, the direct mode traffic channel 5 702. The first period of time D1 712 may be, for example, three slots long (e.g., approximately 90 ms).

Assuming, for the purposes of this example, that no such traffic is found during the first period of time D1 712, the SU proceeds to transmit on the direct mode traffic channel 5 702 for a second period of time D2 714 in order to reserve the direct mode traffic channel 5 702 for its use and to inform other potential direct mode SUs that switch to the direct mode traffic channel 5 702 that the SU intends to use that direct mode traffic channel 5 702 for a new direct mode call. For example, the SU may transmit silent audio on the direct mode traffic channel 5 702. The second period of time D2 714 may be, for example, three slots long (e.g., approximately 90 ms), but in any event, should last until a switching time before the next slot of the direct mode control channel 602 associated with the direct mode traffic channel 5 702. In other words, the SU should continue to transmit on the direct mode traffic channel as long as possible to keep the channel reserved, but must consider the switching time it takes to return to the direct mode control channel and be ready to transmit a new direct mode call header at the beginning of the corresponding traffic channel status slot of the TCSF frame corresponding to direct mode traffic channel 5 702.

In this example, just before the next occurrence of slot 1 of TCSF5 614 in which the SU must announce its new direct mode call to be started on slot 1 of direct mode traffic channel 5 702, the SU stops transmitting on slot 1 of the direct mode traffic channel 5 702 and switches, as illustrated via arrow 716, back to the direct mode traffic channel 602. Then, at the beginning of slot 1 of TCSF5 614, the SU broadcasts a header announcing the intent to start a new call on slot 1 of direct mode traffic channel 5 702. The header may indicate a target talkgroup to which the new direct mode call is directed, may indicate an individual radio identifier identifying a single radio to which the new direct mode call is directed, or provide some other indication of which other direct mode SUs should join the new direct mode call on slot 1 of direct mode traffic channel 5 702. In some embodiments, the header may include an indicator of which direct mode traffic channel (and, in this case, which slot) the new direct mode call will be communicated on, while in other embodiments, the SU may rely upon recipient SUs' knowledge of the particular traffic channel status slot and frame in which the header was transmitted in (e.g., slot 1 of TCSF5 614 being associated with slot 1 of direct mode traffic channel 5 702 in this example) to identify what specific direct mode traffic channel (and, in this case, slot) the new direct mode call will be transmitted.

Each of the other direct mode SUs receiving the header can determine if it is interested in the new direct mode call and, if so, switch to the indicated or determined direct mode traffic channel (slot 1 of direct mode traffic channel 5 702 in this case) to receive the new direct mode call. After transmitting the header in slot 1 of TCSF5 614, the SU switches back to the direct mode traffic channel 5 702 as illustrated by arrow 718 in FIG. 7, and at substantially the beginning of the next slot 1 of the direct mode traffic channel 5 702 (indicated at time 720 in FIG. 7), begins transmitting the new direct mode call on slot 1 of the direct mode traffic channel 5 702. For example, the SU may begin broadcasting voice or data to one or more receiving other direct mode SUs that are receiving on slot 1 of direct mode traffic channel 5 702.

Although not separately illustrated in FIG. 7, call termination by a direct mode SU is accomplished in a similar way to call initiation. Specifically, the transmitting SU first switches back to the direct mode control channel 602 a switching time before the next traffic channel status slot of the direct mode control channel 602 associated with the direct mode traffic channel 5 702 on which it was transmitting, and transmits a call terminator message in the next traffic channel status slot. After transmitting the call terminator message on the direct mode control channel 602, the SU switches back to the direct mode traffic channel 5 702 and transmits a call terminator message on the (in this case, slot 1 of) traffic channel 5 702 as well. After transmitting the call terminator message on the traffic channel 5 702, other direct mode SUs on traffic channel 5 702 are able to talkback during a call hangtime period. Any one of the other direct mode SUs wishing to talk back begins the process by transmitting on the traffic channel 5 702 as set forth in period D2 of FIG. 7, and then proceeds in a similar call setup process as set forth in FIG. 7 after that.

FIGS. 8A and 8B set forth a flowchart illustrating a process 800 used by a direct mode SU for participating in and initiating new direct mode calls using the TDMA direct mode control channel and TDMA direct mode traffic channel of FIG. 7 in accordance with an embodiment of the present disclosure. Of course, similar steps could be implemented for other types of traffic channels.

At step 802 of FIG. 8A, the SU monitors a pre-configured direct mode control channel that is time divided into a plurality of slots including a plurality of traffic channel status slots, each traffic channel status slot associated with a separate physical direct mode traffic channel in the communication system, perhaps similar to direct mode control channel 602 of FIGS. 6 and 7. At step 804, the SU determines whether a new call notification has been transmitted by another direct mode SU in the current traffic channel status slot of the direct mode control channel or whether it has detected a new direct mode call request. If neither, the SU returns to step 802 and monitors a next traffic channel status slot of the direct mode control channel and again determines whether it has detected a new direct mode call request.

If, at step 804, the SU determines that a new call notification has been transmitted by another SU in the current traffic channel status slot of the direct mode control channel, processing proceeds to step 806 where the SU determines whether the direct mode call indicated in the new call notification is of interest to the SU. For example, the SU may process a target talkgroup identifier or target radio identifier included in the new call notification and determine whether its own radio identifier matches the target radio identifier or if it is subscribed to or a member of a talkgroup associated with or identified by the target talkgroup identifier. In other embodiments, the SU may also determine whether the new call notification indicates it is an "all call" or "emergency call" that should be joined, despite the lack of a talkgroup or radio identifier match. If the SU determines that the new direct mode call is not of interest, processing returns to step 802. If, however, the SU determines that the new direct mode call is of interest, processing proceeds to step 808, where the direct mode US determines the direct mode traffic channel on which the new direct mode call will be broadcast. As stated earlier, this information may be embedded within the new call notification, or may be determined implicitly by the SU based on the timing at which the new call notification was received (e.g., which traffic channel status slot and frame number the new call notification was received in for a known traffic channel status frame control channel timing, such as that set forth in FIG. 7).

At step 810, the SU switches to the direct mode traffic channel associated with the new direct mode call, and begins receiving the new direct mode call. Receiving the new direct mode call may include receiving voice frames, decoding the voice frames, and playing back decoded audio from the voice frames via an output transducer, such as the speaker 520 of SU 500 of FIG. 5. At step 812, the SU detects a termination message for the new direct mode call, on either one or both of the traffic channel status slot associated with the direct mode traffic channel on the direct mode control channel, and the direct mode traffic channel itself. Assuming there is no talkback by other direct mode SUs during the call hangtime, processing proceeds back to step 802 and the SU returns to the direct mode control channel.

Returning to step 804, if, on the other hand, a new direct mode call request is detected, processing proceeds to step 820 of FIG. 8B. A new direct mode call request may be detected via an input, such as input 506 of SU 500 of FIG. 5, and may amount to a detected depression of a push to talk (PTT) button on the SU. Other types of actions could cause the SU to detect a new call request as well, including a voice activated new direct mode call request, a detected activation of a touch sensitive input or display icon, or some other input action indicating a user's desire to transmit a new direct mode call to a particular talkgroup or individual radio.

At step 820, the SU selects a direct mode traffic channel on which to conduct the new direct mode call. The choice of which direct mode traffic channel to switch to (at least initially) and check for traffic may be determined in a number of ways, including previously monitoring the direct mode control channel and randomly selecting a direct mode traffic channel out of a pool of direct mode traffic channels that the SU has not witnessed any corresponding activity on (via monitoring corresponding traffic channel status slots). In other embodiments, the SU may initially select a direct mode traffic channel out of the pool that has, over some pre-determined tracked period of time, been the least-utilized traffic channel. In still another embodiment, the SU may initially select a direct mode traffic channel out of the pool that has seen the most recent call termination message transmitted on the direct mode control channel's corresponding traffic channel status slot. Other ways of selecting the initial direct mode traffic channel exist as well.

At optional step 822, the SU switches from the direct mode control channel to the selected direct mode traffic channel and monitors, for a first period of time, for any traffic indicative of another SU's use, or intent to use, the selected direct mode traffic channel. If traffic indicative of another SU's use, or intent to use, the selected direct mode traffic channel is discovered during the first period of time, processing proceeds to optional step 826, where the SU selects a new direct mode traffic channel to transmit the new direct mode call on, and continues back to step 822.

If, on the other hand, traffic indicative of another SU's use, or intent to use, the selected direct mode traffic channel is not discovered during the first period of time, processing proceeds from step 824 to optional step 828, where the SU begins transmitting on the selected direct mode traffic channel in order to reserve the direct mode traffic channel and prevent other direct mode SUs from selecting that direct mode traffic channel. The SU continues to transmit on the direct mode traffic channel until a switching time before the next slot of the direct mode control channel associated with the direct mode traffic channel. In other words, the SU may continue to transmit on the direct mode traffic channel as long as possible to keep the channel reserved, but must consider the switching time it takes to return to the direct mode control channel and be ready to transmit the new call header at the beginning of the next corresponding slot of the TCSF frame (corresponding to the direct mode traffic channel) on the direct mode control channel. For example, the SU may stop transmitting on the direct mode traffic channel and switch to the direct mode control channel one time slot before the next corresponding slot of the TCSF frame (corresponding to the direct mode traffic channel) on the direct mode control channel (see the example set forth above with respect to FIG. 7). In other embodiments, the SU may switch back to the direct mode control channel before or after the one time slot before the next corresponding slot of the TCSF frame (corresponding to the direct mode traffic channel) on the direct mode control channel. At optional step 830, the SU switches back to the direct mode control channel at or prior to the next corresponding slot of the TCSF frame (corresponding to the direct mode traffic channel) on the direct mode control channel.

At step 832, the SU transmits a new direct mode call header during the next corresponding traffic channel status slot of the TCSF frame (corresponding to the selected direct mode traffic channel) on the direct mode control channel. For example, if the new direct mode call is going to be transmitted on slot 1 of traffic channel 5, the SU transmits the new direct mode call header during the traffic channel status slot of the control channel associated with slot 1 of traffic channel 5. The header may be, for example, a link control voice header or a data header. In one embodiment, the identity of the slot and/or direct mode traffic channel on which the new direct mode call will be broadcast is populated in a field of the call header. Accordingly, the identity of the slot and/or direct mode traffic channel on which the new direct mode call will be broadcast, as set forth in the header, may match the traffic channel status slot of the control channel in which the header is transmitted. In other embodiments, the identity of the slot and/or direct mode traffic channel on which the new direct mode call will be broadcast are not disclosed in the header and, instead, the SU may rely upon the particular slot in which the header is transmitted to convey to receiving other direct mode SUs which slot and/or traffic channel the new direct mode call will be broadcast on. Also identified in the header may be a target for the new direct mode call, such as a radio identifier for a private call or a talkgroup identifier for a group call, among other possibilities. The header may also identify the source SU by a radio identifier value associated with the SU. Other information may be included as well, including encryption or decryption information, priority information, quality of service information, security information, whether the call is a voice or data call, or other types of information.

The timing at which the SU transmits the call header may be determined as a function of a preconfigured knowledge of direct mode control channel slot assignments, the identity of the selected direct mode traffic channel (and perhaps slot), and a prior monitoring of the direct mode control channel to learn the slot timing being used in the direct mode communications system, In other words, during monitoring step 802, the SU monitors transmissions on the direct mode control channel and follows the latest slot structure indicated by the most recent transmission on the channel.

In one embodiment, and in the event that there is no known slot timing because either no transmissions have been seen by the SU on the direct mode control channel, or a threshold period of time has passed (such as 1, 10, 30, or 60 minutes) since the SU has seen a transmission indicating slot timing on the direct mode control channel, the SU may wait a pre-determined period of time (such equivalent to three direct mode control channel superframes or 1080 ms) for other direct mode SUs to transmit and provide a timing of the control channel. Absent such a transmission, the SU may create a new timing by simply transmitting the voice header on the direct mode traffic channel identifying the traffic channel status slot it is being transmitted in, thereby providing a new direct mode traffic channel timing for other direct mode radios in the communication system.

At step 834, the SU switches to the selected direct mode traffic channel and begins transmitting the new direct mode call. While the SU is transmitting on the direct mode traffic channel, other direct mode SUs inhibit talkback until the SU transmits a call termination message.

Also at step 834, and in one embodiment, the SU may periodically drop a voice frame and, instead of transmitting the dropped voice frame, return to the direct mode control channel to re-broadcast the call header on the corresponding traffic channel status slot (associated with the selected direct mode traffic channel on which it is transmitting the call) in order to provide a late-entry capability to other direct mode SUs that may have missed the SU's first broadcast of the call header. The SU could then return to the selected direct mode traffic channel and resume broadcasting voice frames of the call. Late-entering direct mode SUs that are interested in the call could then switch to the selected direct mode traffic channel and being receiving audio and/or data associated with the call. In still a further embodiment, and to also support late-entry, the SU may periodically return to the direct mode control channel to re-broadcast the call header on a traffic channel status slot adjacent the corresponding traffic channel status slot associated with the selected direct mode traffic channel on which it is transmitting the call (but within the same traffic channel status frame associated with the selected direct mode traffic channel), in order to provide a late-entry capability to other direct mode SUs that may have missed the SU's first broadcast of the call header. For example, and with respect to FIG. 6, if the SU were transmitting a direct mode call on slot 1 of direct mode traffic channel 5 (and had initially broadcast the call header on traffic channel status slot 1 628 of traffic channel status frame 626), it may periodically return to the direct mode control channel and re-broadcast the call header on traffic channel status slot 2 630 of traffic channel status frame 626, before returning to the direct mode traffic channel 5 to broadcast the next audio frame in the direct mode call. As a result, no audio needs to be dropped on the direct mode traffic channel 5.

At step 836, and responsive to detecting an end to the new direct mode call (e.g., perhaps responsive to detecting a user's release of the PTT button input such as via input 506 of SU 500 of FIG. 5), the SU terminates the new direct mode call via transmissions on both the associated traffic channel status slot of the direct mode traffic channel and the selected direct mode traffic channel itself. More specifically, the SU first switches back to the direct mode control channel a switching time before the next traffic channel status slot of the direct mode control channel associated with the selected direct mode traffic channel and transmits a call terminator message in the corresponding traffic channel status slot (associated with the selected direct mode traffic channel). After transmitting the call terminator message on the direct mode control channel status slot, the SU switches back to the selected direct mode traffic channel and transmits the call terminator message on the selected direct mode traffic channel as well. After transmitting the call terminator message on the direct mode control channel and the selected direct mode traffic channel, the SU proceeds to step 802, switching back to the direct mode control channel and beginning monitoring the direct mode control channel for new call notifications or talkback call notifications, among other possibilities.

III. Conclusion

In accordance with the foregoing, a method and a device to for reusing direct mode channel frequencies is disclosed that allows the more efficient channel allocation and channel re-use features of infrastructure-based trunked system to applied to direct mode systems in which no centralized infrastructure is available to arbitrate, assign, and allocate traffic channels for requested calls. As a result, a more robust and adaptable communications system can be provided, improving communication capabilities of direct mode radio communications system. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. In a direct mode two-way radio frequency (RF) communications system having a plurality of direct mode traffic channels and a plurality of direct mode subscriber units, a method comprising:
   monitoring, by a first direct mode subscriber unit, a preconfigured direct mode control channel, the direct mode control channel being a channel that is monitored by all direct mode subscriber units that are idle in the system, and which is time divided into a plurality of slots including a plurality of traffic channel status slots, each traffic channel status slot associated with a particular physical direct mode traffic channel in the communication system; and
   responsive to detecting a request to initiate a direct mode call:
      selecting, by the first direct mode subscriber unit, a first particular direct mode traffic channel on which to transmit the direct mode call;
      transmitting, by the first direct mode subscriber unit, during the next traffic channel status slot of the direct mode control channel that is associated with the selected direct mode traffic channel, a header indicating the first direct mode subscriber unit's intention to transmit a direct mode call on the selected direct mode traffic channel; and
      subsequently switching to the selected direct mode traffic channel and transmitting the direct mode call on the selected direct mode traffic channel.

2. The method of claim 1, wherein the direct mode call is a group call, and transmitting the direct mode call comprises broadcasting voice and/or data to a plurality of other direct mode subscriber units on the selected direct mode traffic channel.

3. The method of claim 1, wherein the header is a link control voice header, and wherein the link control voice header is populated with information identifying the traffic channel status slot in which it is transmitted as associated with the selected direct mode traffic channel.

4. The method of claim 1, wherein selecting the first particular direct mode traffic channel comprises:
   selecting, by the first direct mode subscriber unit, an initial direct mode traffic channel;

switching, by the first direct mode subscriber unit, to the initial direct mode traffic channel and monitoring, for a first predetermined period of time, the initial direct mode traffic channel for any traffic indicative of another direct mode subscriber unit using, or intending to use, the initial direct mode traffic channel; and responsive to failing to detect any indicative traffic on the initial direct mode traffic channel for the first predetermined period of time:

selecting, by the first direct mode subscriber unit, the initial direct mode traffic channel as the selected direct mode traffic channel, and transmitting, by the first direct mode subscriber unit, on the initial direct mode traffic channel for a second period of time in order to reserve the initial direct mode traffic channel for the direct mode call; and prior to a time at which the next traffic channel status slot of the direct mode control channel that is associated with the initial direct mode traffic channel arrives, switching, by the first direct mode subscriber unit, back to the direct mode control channel.

5. The method of claim 1, wherein selecting the first particular direct mode traffic channel comprises:

selecting, by the first direct mode subscriber unit, an initial direct mode traffic channel;

switching, by the first direct mode subscriber unit, to the initial direct mode traffic channel and monitoring, for a first predetermined period of time, the initial direct mode traffic channel for any traffic indicative of another direct mode subscriber unit using, or intending to use, the initial direct mode traffic channel;

responsive to detecting indicative traffic on the initial direct mode traffic channel, selecting, by the first direct mode subscriber unit, a second initial direct mode traffic channel different from the first initial direct mode traffic channel;

switching, by the first direct mode subscriber unit, to the second initial direct mode traffic channel and monitoring, for the first predetermined period of time, the second initial direct mode traffic channel for any traffic indicative of another direct mode subscriber unit already using, or intending to use, the second initial direct mode traffic channel; and responsive to failing to detect any indicative traffic on the second initial direct mode traffic channel for the first predetermined period of time:

selecting, by the first direct mode subscriber unit, the second initial direct mode traffic channel as the selected direct mode traffic channel, and transmitting, by the first direct mode subscriber unit, on the second initial direct mode traffic channel for a second period of time in order to reserve the second initial direct mode traffic channel for the direct mode call; and prior to a time at which the next traffic channel status slot of the direct mode control channel that is associated with the second initial direct mode traffic channel arrives, switching, by the first direct mode subscriber unit, back to the direct mode control channel.

6. The method of claim 1, wherein monitoring the direct mode control channel further comprises monitoring for transmissions by any other direct mode subscriber units, and responsive to detecting a header transmission from a first transmitting direct mode subscriber unit, identifying the timing at which the header was transmitted and decoding the header transmission to identify during which direct mode control channel slot the header transmission was transmitted, and adjusting direct mode control channel timing at the first direct mode subscriber unit to align with the transmission.

7. The method of claim 6, further comprising using the adjusted direct mode control channel timing and a preconfigured knowledge of direct mode control channel slot assignments to determine when to transmit the header indicating the first direct mode subscriber unit's intention to transmit the call on the selected direct mode traffic channel.

8. The method of claim 1, wherein:

monitoring the direct mode control channel further comprises monitoring for transmissions by any other direct mode subscriber units and failing to detect any transmission indicative of a direct mode control channel timing of the direct mode communication system; and transmitting, by the first direct mode subscriber unit, during the next traffic channel status slot of the direct mode control channel associated with the selected direct mode traffic channel, a header indicating the first direct mode subscriber unit's intention to transmit a call on the selected direct mode traffic channel comprises arbitrarily selecting a time to transmit the header, the header populated with information identifying the traffic channel status slot in which it is transmitted as associated with the selected direct mode traffic channel.

9. The method of claim 1, wherein the plurality of slots further include a control signaling block slot.

10. The method of claim 1, wherein each traffic channel status slot is associated with a physical frequency division multiple access (FDMA) traffic channel in the communication system.

11. The method of claim 1, wherein each traffic channel status slot is associated with a physical time division multiple access (TDMA) traffic channel in the communication system.

12. The method of claim 1, further comprising, after completing the direct mode call, continuing to monitor the direct mode control channel for second direct mode call announcements and, responsive to detecting a second call header announcing a second call that is of interest to the first direct mode subscriber unit, determining, from one of the timing of the second call header and the contents of the second call header, which second particular direct mode traffic channel the second call will be transmitted on, and switching to the second particular direct mode traffic channel to receive the second direct mode call.

13. A direct mode two-way radio frequency (RF) subscriber unit comprising:

a transceiver; and a processor configured to:

monitor, via the transceiver, a preconfigured direct mode control channel, the direct mode control channel being a channel that is monitored by all direct mode subscriber units that are idle in the system, and which is time divided into a plurality of slots including a plurality of traffic channel status slots, each traffic channel status slot associated with a particular physical direct mode traffic channel in the communication system; and responsive to detecting a request to initiate a direct mode call:

select a first particular direct mode traffic channel on which to transmit the direct mode call;

transmit, via the transceiver and during the next traffic channel status slot of the direct mode control channel that is associated with the selected direct mode traffic channel, a header indicating the first direct mode subscriber unit's intention to transmit a direct mode call on the selected direct mode traffic channel; and subsequently switch to the selected direct mode traffic channel and transmit, via the transceiver, the direct mode call on the selected direct mode traffic channel.

14. The subscriber unit of claim 13, wherein the direct mode call is a group call, and wherein the processor is configured to transmit the direct mode call by broadcasting voice and/or data, via the transceiver, to a plurality of other direct mode subscriber units on the selected direct mode traffic channel.

15. The subscriber unit of claim 13, wherein the header is a link control voice header, and wherein the link control voice header is populated with information identifying the traffic channel status slot in which it is transmitted as associated with the selected direct mode traffic channel.

16. The subscriber unit of claim 13, wherein the processor is configured to select the first particular direct mode traffic channel by:

selecting an initial direct mode traffic channel;

switching, via the transceiver, to the initial direct mode traffic channel and monitoring, via the transceiver for a first predetermined period of time, the initial direct mode traffic channel for any traffic indicative of another direct mode subscriber unit using, or intending to use, the initial direct mode traffic channel; and responsive to failing to detect any indicative traffic on the initial direct mode traffic channel for the first predetermined period of time:

selecting the initial direct mode traffic channel as the selected direct mode traffic channel, and transmitting, via the transceiver on the initial direct mode traffic channel for a second period of time in order to reserve the initial direct mode traffic channel for the direct mode call; and prior to a time at which the next traffic channel status slot of the direct mode control channel that is associated with the initial direct mode traffic channel arrives, switching, via the transceiver, back to the direct mode control channel.

17. The subscriber unit of claim 13, wherein the processor is configured to select the first particular direct mode traffic channel by:

selecting an initial direct mode traffic channel;

switching, via the transceiver, to the initial direct mode traffic channel and monitoring, via the transceiver, the initial direct mode traffic channel for any traffic indicative of another direct mode subscriber unit using, or intending to use, the initial direct mode traffic channel;

responsive to detecting indicative traffic on the initial direct mode traffic channel, selecting a second initial direct mode traffic channel different from the first initial direct mode traffic channel;

switching, via the transceiver, to the second initial direct mode traffic channel and monitoring, via the transceiver, the second initial direct mode traffic channel for any traffic indicative of another direct mode subscriber unit already using, or intending to use, the second initial direct mode traffic channel; and responsive to failing to detect any indicative traffic on the second initial direct mode traffic channel for the first predetermined period of time:

selecting the second initial direct mode traffic channel as the selected direct mode traffic channel, and transmitting, via the transceiver, on the second initial direct mode traffic channel for a second period of time in order to reserve the second initial direct mode traffic channel for the direct mode call; and prior to a time at which the next traffic channel status slot of the direct mode control channel that is associated with the second initial direct mode traffic channel arrives, switching, via the transceiver, back to the direct mode control channel.

18. The subscriber unit of claim 13, wherein the processor is further configured to:

monitor the direct mode control channel for transmissions by any other direct mode subscriber units, and responsive to detecting a header transmission from a first transmitting direct mode subscriber unit, identify the timing at which the header was transmitted and decoding the header transmission to identify during which direct mode control channel slot the header transmission was transmitted, and adjusting direct mode control channel timing to align with the transmission.

19. The subscriber unit of claim 18, wherein the processor is further configured to:

use the adjusted direct mode control channel timing and a preconfigured knowledge of direct mode control channel slot assignments to determine when to transmit, via the transceiver, the header indicating the subscriber unit's intention to transmit the call on the selected direct mode traffic channel.

20. The subscriber unit of claim 13, wherein the processor is further configured to:

monitor the direct mode control channel for transmissions by any other direct mode subscriber units and responsive to failing to detect any transmission indicative of a direct mode control channel timing of the direct mode communication system:

transmit, via the transceiver, the header indicating the first direct mode subscriber unit's intention to transmit the call on the selected direct mode traffic channel at an arbitrarily selected time, the header populated with information identifying the traffic channel status slot in which it is transmitted as associated with the selected direct mode traffic channel.

21. The subscriber unit of claim 13, wherein the processor is further configured to:

after completing the direct mode call, continue to monitor the direct mode control channel, via the transceiver, for second direct mode call announcements and, responsive to detecting a second call header announcing a second call that is of interest to the first direct mode subscriber unit, determine, from one of the timing of the second call header and the contents of the second call header, which second particular direct mode traffic channel the second call will be transmitted on, and switch to the second particular direct mode traffic channel to receive the second direct mode call.

* * * * *